United States Patent Office 3,681,179
Patented Aug. 1, 1972

3,681,179
MOISTURE-RESISTANT SOLAR CONTROL FILM
Donald R. Theissen, St. Paul, Minn., assignor to Minnesota Mining and Manufacturing Co., St. Paul, Minn.
Continuation-in-part of application Ser. No. 678,013, Oct. 25, 1967. This application July 20, 1970, Ser. No. 56,379
Int. Cl. B44f *1/00;* A61l *15/06*
U.S. Cl. 161—4  11 Claims

ABSTRACT OF THE DISCLOSURE

Solar control film having a water-activatable adhesive system comprising a normally tacky and pressure-sensitive adhesive coating which is covered by a thin tack-free continuous water-soluble layer. The product, which does not require a liner, can be moistened and installed on a windowpane, the water-soluble layer providing lubrication during positioning and the pressure-sensitive adhesive providing the primary bonding to the glass.

CROSS-REFERENCES TO RELATED APPLICATIONS

This application is a continuation-in-part of copending U.S. application Ser. No. 678,013, filed Oct. 25, 1967, now abandoned.

BACKGROUND OF THE INVENTION

In recent years reflective-transparent solar control film has achieved an important place in the economy of the United States and several other countries. Products of this type commonly involve a 1-mil biaxially oriented polyethylene terephthalate film, having a vapor-deposited aluminum layer about 25–125 microns thick on one face. The aluminum layer is contacted and protectively covered by a thin, transparent water-insoluble moisture-transmitting barrier coat. As shown in Antonson and Berger U.S. Pat. 3,290,203, a water-activatable adhesive is used to bond the thus-protected aluminum surface of the film to the inside of a windowpane, the water which activates the adhesive slowly escaping through the barrier coat, aluminum layer and base film over a period of a few days.

Reference is directed to the aforementioned Antonson and Berger patent for a description of how laminated windowpanes formed in this manner serve to substantially reduce heat transmission into the room on which the window opens without significantly reducing light transmission. Laminated windowpanes of this type can be formed by applying a water-soluble adhesive to either the glass or the protectively coated surface of the film prior to lamination. In either case, the slippery nature of the adhesive permits sliding the film to position it precisely against the glass. This feature is particularly important when it is considered that the film applied to a given windowpane may easily be 4 feet wide and 6 feet long.

Despite the commercial success achieved by solar control films of the type described above, conditions are sometimes encountered where such products do not have the useful life which would be desirable. This is particularly true when the interior surface of the laminated windowpane is exposed to extremely high humidity, especially when condensation or frost formation results. In such conditions, the film sometimes loosens, resulting in the appearance of unattractive "fingers" where the film pulls away from the glass, reducing the effectiveness of the film and greatly marring the esthetic qualities of the laminated windowpane. Even so, complete removal of the film under normal conditions can be accomplished only after subjecting it to steam, applying wet newspapers for an hour or so, etc.

Palmquist and Erwin U.S. Pat. 3,152,950 discloses an opaque heavily metallized polyester film in which a normally tacky and pressure-sensitive adhesive layer is applied over the metal coating. It might be supposed that the water-activatable adhesive employed in the aforementioned Antonson and Berger patent could be replaced with a normally tacky and pressure-sensitive adhesive of the type used by Palmquist and Erwin, but doing so is fraught with serious problems. Although it is easy enough to unwind, sever, and apply a length of comparatively narrow pressure-sensitive adhesive tape, it is virtually impossible to work with a large area of such a product.

To handle a large piece of pressure-sensitive adhesive sheet material at all, it is necessary to employ a removable release liner which protects the adhesive until the sheet material is to be applied but which also increases the cost of the product. Even after the liner is removed, the large sheet of material tends to stick to itself, to become impressed with the fingerprints of applying personnel, to pick up lint, etc., all of which disfigures a solar control film and destroys one of the main requirements for its acceptability. Further, the pressure-sensitive nature of the adhesive is such that it is difficult to reposition a sheet of film once it is placed in contact with the glass. Unless great care is exercised, this difficulty in positioning exists even when water or detergent-containing water is applied to the windowpane, the pressure-sensitive adhesive, or both, prior to installation.

It has heretofore been suggested that small decals could be provided with a tacky adhesive, temporarily inactivated by a water-soluble coating, for mounting on the object to which the decal is ultimately to be applied. U.S. Pat. 2,641,562, for example, teaches that the decal can be immersed in water, immediately dissolving the water-soluble coating, and then applied directly to the appropriate substrate. Although it might be supposed that a solar control film could similarly be provided with a pressure-sensitive adhesive temporarily inactivated by a water-soluble coating, those skilled in the art have been discouraged from doing so.

It is simple enough to immerse a decal in water and thus remove a water-soluble coating, but the problem is far more complicated when a solar control film of considerable area is to be handled. Washing the coating from a 4-foot x 6-foot piece of film is difficult, and, even if such is accomplished, the resultant product possesses the difficult handling characteristics previously ascribed to pressure-sensitive solar control film products. It is reasonable to suppose that failure to completely remove the water-soluble coating would prevent the pressure-sensitive adhesive from firmly bonding the solar control film to the windowpane. Indeed, it has been found that when a decal of the type just described is subjected to a stream of running water without completely removing the water-soluble coating, and the thus-washed product allowed to dry, the pressure-sensitive adhesive is still so effectively masked that it displays only very mild adhesion. Although adequate for decals, which are extremely thin and small, such adhesion is entirely inadequate for use with solar control film. Further, the washed and dried product has hazy, blurred, non-uniform and otherwise unsatisfactory optical properties which point away from any use on a windowpane.

Special problems are also involved in the use of pressure-sensitive adhesives in the presence of sunlight. Many such adhesives crosslink and/or discolor when exposed to ultraviolet light. Still other adhesives do not age or discolor but bond so firmly to glass that any attempt to remove sheet material therefrom leaves the adhesive bonded to the glass.

Thus, prior to the present invention, it is believed that there has never existed a moisture-resistant transparent-reflective solar control film which can be readily handled, easily installed in large pieces on a window, easily positioned, quickly adhered, and readily removed.

SUMMARY

The present invention provides a novel solar control film which has all the advantages of the product described in Antonson and Berger U.S. Pat. 3,290,203 plus a number of advantages not possessed by that product. Although provided with a normally tacky and pressure-sensitive adhesive, this novel product can be handled, even in the form of extremely large sheets or wide rolls, without using a removable liner and without incurring the danger of premature adhesion to an undesired substrate or contaminating material. Applied to a windowpane, the resultant product is adherently bonded thereto, forming a laminate which is of high optical quality, i.e., free from haze, distortion, irregularities, bubbles, "fish eyes" and similar defects possessed by prior art products. In the preliminary stages of application, the product can be easily shifted on the windowpane to more correctly align its location, and if a small area inadvertently becomes adhered to the window, the film can be removed without transfer of the pressure-sensitive adhesive to the glass surface. At such time as it may be desired to remove the installed film, this can likewise be easily accomplished without leaving adhesive residue on the glass.

In its simplest terms, the invention comprises a solar control film made by applying a normally tacky and pressure-sensitive adhesive layer over the aluminum vapor deposit-coated surface of a transparent polymeric film and then applying thereover a thin layer of a water-soluble film-forming material, thereby forming a water-activatable adhesive system. The thus-protected surface of the pressure-sensitive adhesive is not tacky, and hence is neither contaminated by dirt nor prone to stick to itself. Even wide rolls of this product can be readily unwound by one man without distorting the backing. When the product is to be used, the water-soluble coating is moistened, thereby rendering the surface somewhat slippery without at the same time removing the water-soluble coating. When this slippery surface is placed against the windowpane, the solar control film can be slid to the desired location. A squeegee is then used to force the film against the glass and expel some of the excess water at the edges. Any excess water is then gradually transmitted through the film into the interior of the room on which the window opens, after which it is found to be firmly anchored to the glass. It is surprising that, even though much of the water-soluble material remains, apparently interposed between the pressure-sensitive adhesive and the glass, the bond is strong and predominantly formed by the pressure-sensitive adhesive.

As is taught by Antonson and Berger, it is important to have a protective moisture vapor-transmitting layer interposed between the aluminum deposit and the glass surface so that the moisture which is transmitted through the film does not corrode the aluminum. To a considerable extent, the normally tacky and pressure-sensitive adhesive layer itself performs this function; however, since minor variations in the pH of the adhesive may result in attack of the aluminum layer, it is preferred to employ an additional barrier coat between the pressure-sensitive adhesive and the aluminum layer. In order to insure the integrity of the structure, it is usually considered desirable to employ a primer coating between the barrier coat and the pressure-sensitive adhesive layer. The necessity for, or type of, a primer is, of course, dependent on the specific barrier coat and pressure-sensitive adhesive employed.

BRIEF DESCRIPTION OF THE DRAWING

Understanding of the invention will be facilitated by referring to the accompanying drawing, in which:

In FIG. 1, solar-control film 10 comprises transparent polymer film backing 11, on one face of which is coated thin transparent and reflective metal layer 12. Layer 12 is in turn coated with protective layer 13, primer layer 14, and water-activatable adhesive system 15, consisting essentially of normally tacky and pressure-sensitive adhesive layer 16 and water-soluble layer 17.

In FIG. 2, laminated windowpane structure 20 comprises a solar control film firmly adherently bonded to one face of glass 25. The solar control film comprises transparent polymeric film backing 21 having metallized aluminum layer 22 on one face thereof. Coated over aluminum layer 22 is pressure-sensitive adhesive layer 23, which also serves the function of a barrier coat in preventing corrosion by moisture vapor. Adhesive layer 23 is in extremely close juxtaposition to, or in direct contact with, glass 25, although an extremely thin layer of water-soluble material 24 is apparently also present at the interface between glass 25 and the solar control film.

DESCRIPTION OF PRESENTLY PREFERRED EMBODIMENTS

Figure 1:
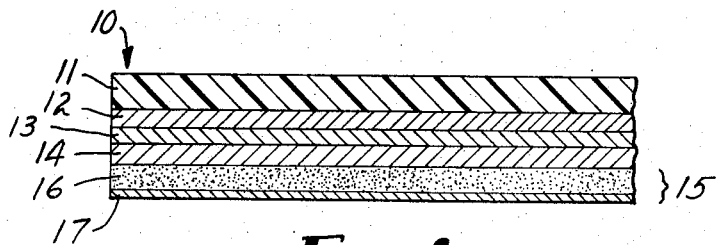
FIG. 1 is a cross-sectional representation of a solar control film made in accordance with the invention.
Figure 2:
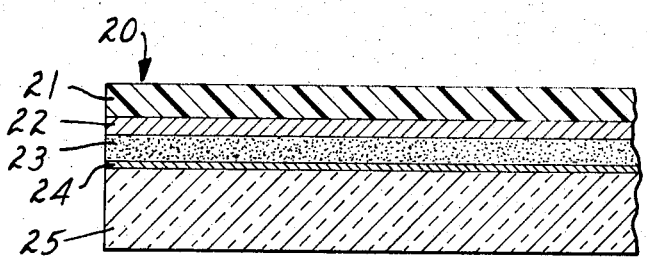
FIG. 2 is a cross-sectional representation of a laminated windowpane structure made using a solar-control film of the present invention.

As a further aid to understanding the following illustrative but nonlimiting examples are provided:

Example 1

A 1-mil biaxially oriented polyethylene terephthalate film 48 inches wide was vapor coated with aluminum by conventional techniques to a metal thickness of about 125 angstroms, thereby reducing the light transmission at 5500 angstroms wavelength to approximately 10% the value of the uncoated film, as measured by a Beckman DK-2 Spectrophotometer. Over the metal was then applied an 8% solution of a barrier coating consisting of 1:1 ethylene terephthalate: ethylene isophthalate copolymer containing 0.75% by weight of 2,2' dihydroxy-4-methoxybenzophenone (an ultraviolet light absorber commercially available from American Cyanamid Co. under the trade designation "Cyasorb" UV 24) in 1,1,2 trichloroethane, the total dry coating weight being 1 grain per 24 square inches. The solvent was then evaporated. The light transmission at 5500 angstroms for the metallized barrier-coated film was found to be 18% of the value measured for the clear film. The coated film was then slit to a width of 24 inches.

Over the barrier-coated film was applied a thin layer of primer in an amount equal to approximately 0.1 dry grain per 24 square inches. The composition of this primer was as follows:

| Component: | Parts by weight |
| --- | --- |
| 50:47:3 isooctyl acrylate:vinyl acetate:acrylic acid terpolymer | 4 |
| Polymethyl acrylate ("Acryloid" C10LV, commercially available from Rohm & Haas) | 4 |
| Baking phenolic resin (BKR 2620, commercially available from Bakelite) | 0.16 |
| 70:30 methyl isobutyl ketone:isopropanol, solvent | 8.8 |

The solvent was then evaporated from the primer and an ethyl acetate:heptane solution of a 96:4 isooctyl acrylate:acrylamide copolymer pressure-sensitive adhesive applied in an amount sufficient to leave 3 dry grains per 24 square inches after evaporation of the solvent.

A water-soluble film weighing approximately 0.10 to 0.15 grain per 24 square inches was separately prepared by casting a 4% aqueous solution of a vinyl ether:maleic acid copolymer (hydrolyzed form of a vinyl methyl ether:maleic anhydride copolymer, commercially available from General Aniline & Film Corporation under the trade designation "Gantrez" AN–169), containing 1% wetting agent (polyoxyethylene glycol adduct of nonyl phenol, commercially available from General Aniline & Film Corporation under the trade designation "Igepal" CO 630) based on solids present, on a 1-mil temporary carrier sheet of biaxially oriented polyethylene terephthalate film, evaporating the water to leave an extremely thin, dry tackfree film, and winding the laminate on itself in roll form. The vinyl ether:maleic acid copolymer film was then transferred to the surface of the normally tacky and pressure-sensitive adhesive by placing it in contact therewith and removing the polyethylene terephthalate carrier sheet. The resultant product could be wound upon itself in roll form, unwound with very little effort, and handled conveniently with no detrimetal effect on the product.

A 24-inch x 54-inch sheet of the material formed as described in this example was wet with water, applied to a clean plate glass window, positioned, and squeegeed to remove the excess water and water-soluble adhesive. The sheet material was in uniform contact with the glass but could be removed if desired. After drying for a period of approximately two hours, the edges of the product were firmly bonded. After three days, the entire product had developed a firm adhesion for the window. Unlike the prior art products which employ water-soluble adhesives alone, this product could be completely removed by simply peeling it from the window without separate steaming or soaking techniques, facilitating its replacement when desired.

Example 2

A metallized, barrier-coated and primed film prepared as in the first two paragraphs of Example 1 was coated with an ethyl acetate:heptane solution of a 96:4 isooctyl acrylate:acrylamide copolymer pressure-sensitive adhesive and the solvent evaporated to leave 1.0 grain of adhesive per 24 square inches. The surface of this adhesive was then overcoated with a 2% solids aqueous solution of methyl cellulose (15 cps. MC Standard "Methocel," sold by Dow Chemical Co.) to leave a dry coating weight of 0.2 grain per 24 square inches. The product of this example could be wound upon itself in roll form and retained for an extended period of time under normal storage conditions without adversely affecting either its appearance or its performance. The roll could be unwound with very little effort and with no tendency toward distortion or self-adhesion, even when it came into face-to-face contact. When a large sheet of this product was thoroughly wet with water, applied to a clean glass surface, positioned, squeegeed to remove the excess moisture, and allowed to dry, the resultant laminate displayed good optical properties. The laminate had a film-to-glass adhesion comparable to that obtained by applying a non-overcoated but otherwise identical pressure-sensitive product, either dry or wet.

Example 3

Example 2 was repeated, substituting for the methylcellulose a crystalline thermoplastic ethylene oxide polymer ("Polyox" WSR N–750, having a molecular weight of about 300,000, sold by Union Carbide). Polymers of the "Polyox" type, molecular weights of which may range from 100,000 to 4,000,000, provide extremely desirable film-forming overcoats. They are nonionic, highly water-soluble, provide good lubricity, do not suffer from the inverse solubility-temperature relationship characteristic of methyl cellulose and most other high molecular weight water soluble resins, and, despite their complete water-solubility, are not especially absorptive of atmospheric moisture when dry.

The water-soluble overcoat is preferably incompatible with the pressure-sensitive adhesive, so as to prevent any gradual plasticization or softening of the pressure-sensitive adhesive which would cause the surface to become tacky and/or adversely affect the adhesive properties. The overcoat is also desirably free of potentially aluminum-corrosive ions (such as alkaline ions). Materials found to be useful as water-soluble overcoats, in addition to those illustrated in the preceding examples, include casein, cooked starch, polyvinyl-pyrrolidone (PVP), and hide glue. Starch is not especially water-soluble and hence is less readily activated than the remaining materials. Casein and hide glue suffer from some drawbacks—smell, difficulty of compounding, and variation in composition because of their "natural product" origin.

"Gantrez" AN and PVP perform well in all regards except for a tendency to crack when coated directly onto the pressure-sensitive adhesive as in Example 2. Incorporation of 15% water-soluble plasticizers, e.g. phthalate esters, diethylene glycol, low molecular weight polyethylene glycol, etc. into the "Gantrez" AN and PVP solutions, minimizes or eliminates cracking, but slightly reduces adhesion to glass, and may cause oozing, adhesive blemish, and/or a tendency toward roll blockage upon storage because of the softer and more humectant character of the plasticized overcoat formulation.

It has been found that as little as 0.1 grain per 24 square inches of the water-soluble material is usually effective in preventing the structure from becoming tacky while still permitting easy reactivation. The optimum quantity of water-soluble material needed is directly related to such factors as the thickness and/or tackiness of the pressure-sensitive adhesive employed. The maximum amount of water-soluble adhesive which may be employed appears to be limited primarily by reasons of economy and convenience. No particular advantage is seen to increasing the amount of this material, particularly since most of it must be forced out at the edges of the sheet material when it is applied, but as much as 2 grains per 24 square inches has been used satisfactorily. Some problems may be encountered with higher coating weights, which tend to crack or craze, especially if coated directly on the pressure-sensitive adhesive coated surfaces rather than separately formed and transferred thereto.

In selecting a pressure-sensitive adhesive for use in making solar control films in accordance with the invention, a number of criteria and desiderata should be borne in mind. For example, the adhesive should neither discolor nor excessively crosslink in the presence of sunlight, else the appearance of the product will be adversely affected and removal will be extremely difficult. Similarly, especially when the adhesive also functions as the sole barrier coat, it is important that it be essentially neutral in the presence of moisture to prevent transparentizing of the aluminum layer.

Likewise, aggressiveness of the adhesive should be given careful consideration. In this regard, it has been found helpful to employ a modified form of the 180° peel adhesion test specified as PSTC-1 in "Test Methods for Pressure Sensitive Tapes," Pressure-Sensitive Tape Council, Glenview Illinois or as Federal Test Method Standard 147b, Method 10.1. In this test a 2-inch x 5-inch x ⅜-inch scratchfree, clean plate glass panel is utilized. The adhesive to be evaluated is coated from an appropriate solvent on the face of 6-inch wide 1-mil unprimed biaxially oriented polyethylene terephthalate film and dried in a forced air oven at 150° F. for 20 minutes, leaving a dry adhesive weight of 6±0.5 grains per 24 square inches. A 1-inch x 5-inch strip of the adhesive-coated film is then placed in contact with, and in the center of, the glass plate and firmly rolled down so as to remove any air bubbles. One end of the strip is then doubled back on itself till it extends beyond the opposite end of the glass panel; this free end of the strip is clamped in one set of jaws on a tensile testing machine while the opposite end of the panel is clamped in the other set of jaws. The two sets of jaws are then separated at 12 inches per minute while the force of separation is continuously monitored; the adhesion value is then reported in ounces per inch of width. The adhesive should not transfer to the glass panel during removal.

Although useful products can be made in which the pressure-sensitive adhesive has an adhesion value (measured as described in the preceding paragraph) within a fairly broad range, several factors should be taken into consideration in preparing optimum products. For example, the adhesion value should be at least high enough to discourage vandalism, 10 ounces per inch of width presently being considered a minimum value. The upper limit of adhesion value is determined primarily by such practical considerations as the difficulty in removing a solar control film when it must be replaced, 100 ounces per inch presently being considered a maximum value. At the time of removal, the affinity of the adhesive for the glass should be less than its affinity for the rest of the solar control film structure and should not exceed the strength of the film structure. Further, it is very desirable to be able to remove the film without first having to score it into excessively narrow strips. All things being considered, it has been found particularly desirable to utilize adhesives which have an initial adhesion value of at least about 20 ounces per inch of width and an adhesion value, after aging for 16 hours at 150° F., of not more than about 50 ounces per inch of width. Acrylate copolymer pressure-sensitive adhesives, which possess clarity and resistance to aging, have been found especially desirable but may be replaced with polyvinyl ethyl ether, tacky vinyl acetate:acrylate copolymers, etc.

I claim:

1. Flexible adhesive-coated solar control film which is normally not tacky, can be wound on itself in roll form without the use of a protective liner, readily unwound and easily handled in large sheets but which is capable of being firmly, adherently but removably bonded to a glass sheet with a pressure-sensitive adhesive to provide a bubble-free transparent laminated structure, said solar control film comprising in combination:
   a transparent film backing,
   a thin transparent aluminum coating on one face of said backing,
   a thin, transparent moisture-transmitting barrier layer coated over the aluminum,
   a thin, transparent primer layer coated over said barrier layer, and
   a water-activatable adhesive system comprising:
      a uniform continuous layer of normally tacky water-insoluble pressure-sensitive adhesive coated over said primer layer and firmly adherently bonded thereto and
      a thin, uniform continuous light-transmitting tackfree film-forming water-soluble material coated over and firmly bonded to said layer of pressure-sensitive adhesive,
   whereby water may be applied to the water-soluble material to activate it and render its surface slippery, thus permitting the solar control film to be readily positioned on a glass windowpane in a desired location, after which excess water and water-soluble material can be expelled at the edges of said film and the remaining water evaporated through said film to permit the pressure-sensitive adhesive to bond firmly to said windowpane and form a laminated structure having excellent optical properties.

2. The solar control film of claim 1 wherein the water-soluble material is essentially incompatible with the pressure-sensitive adhesive, thereby permitting said solar control film to be stored for long periods of time without the coated surface's becoming tacky or the pressure-sensitive adhesive quality's being adversely affected.

3. The solar control film of claim 2 wherein the water-soluble material is selected from the group consisting of vinyl ether:maleic acid copolymers and ammonium salts thereof.

4. The solar control film of claim 2 wherein the water-soluble material is methyl cellulose.

5. The solar control film of claim 2 wherein the water-soluble material is a high molecular weight crystalline thermoplastic ethylene oxide polymer.

6. The solar control film of claim 2 wherein the film backing consists essentially of a biaxially oriented polyethylene terephthalate film.

7. The solar control film of claim 2 wherein the pressure-sensitive adhesive is one which is resistant to sunlight-induced discoloration and has an adhesion value to glass in the range of 10-100 ounces per inch of width, even after being applied thereto and exposed to sunlight for several months.

8. The solar control film of claim 7 wherein the adhesion to glass is in the range of 20 to 50 ounces per inch of width.

9. In a solar control film of the type comprising an optically clear flexible polymeric film backing having on one surface a transparent reflective corrodible metal coating on the order of 25 to 125 angstroms thick, a transparent moisture transmitting water-insoluble protective organic coating uniformly contacting and firmly bonded to said metal coating, and a transparent water-activatable adhesive layer uniformly contacting and firmly bonded to said protective coating, the improvement which comprises:
   using as said adhesive layer a system which comprises:
      a primer layer over said organic coating,
      a uniform continuous layer of normally tacky water-insoluble pressure-sensitive adhesive bonded to said primer layer, and
      a thin, uniform continuous transparent layer of film-forming tackfree water-soluble material coated over and firmly bonded to said layer of pressure-sensitive adhesive so as to constitute the outermost portion of said adhesive layer,
   whereby said solar control film can be readily handled in large sheets without the use of a liner but can be moistened and immediately applied to a glass surface without removing the water-soluble material to permit the pressure-sensitive adhesive to establish bonding contact with said glass.

10. A method of forming a laminated window glazing consisting essentially of a rigid transparent pane and a flexible light-transmitting solar control film comprising the steps of:
   providing a thin, highly flexible solar control film comprising in combination:
      a transparent film backing
      a thin transparent metal coating on one face of said backing and
      a water activatable adhesive system comprising:
         a uniform continuous layer of normally tacky water-insoluble pressure-sensitive adhesive coated over and firmly adherently bonded to said metal coating and a thin, uniform continuous transparent layer of tack-free film-forming water-soluble material coated over and firmly bonded to said layer of pressure-sensitive adhesive, applying water to the surface of the water-soluble material, thereby tending to dissolve said material and render the surface thereof slippery, placing the slippery surface of said solar control film in contact with, and sliding it to a predetermined location on, said pane, squeegeeing the exposed surface of said solar control film to expel excess water and water-soluble material and achieve uniform contact between said pane and said film throughout their coextensive areas, and permitting the remaining water to evaporate, thereby bringing the pressure-sensitive adhesive into firm bonding contact with the pane.

11. A laminated windowpane made by the method of claim 10.

References Cited

UNITED STATES PATENTS 3,290,203  12/1966  Antonson et al. _____ 161—4
2,650,181  8/1953  Streed et al. _____ 117—76 A DOUGLAS J. DRUMMOND, Primary Examiner U.S. Cl. X.R.

161—214, 406; 117—122 S

UNITED STATES PATENT OFFICE
CERTIFICATE OF CORRECTION

Patent No. 3,681,179                    Dated August 1, 1972

Inventor(s)    Theissen

It is certified that error appears in the above-identified patent and that said Letters Patent are hereby corrected as shown below:

Column 5, under "Parts by Weight", line 8, "4" should be -- 1 --.

Signed and sealed this 6th day of March 1973.

(SEAL)
Attest:

EDWARD M. FLETCHER, JR.          ROBERT GOTTSCHALK
Attesting Officer                Commissioner of Patents